United States Patent [19]

Pietsch et al.

[11] 4,213,594
[45] Jul. 22, 1980

[54] VEHICLE SEAT

[76] Inventors: Helge Pietsch, An der Wasserbrede 21, 4930 Detmold-Lossbruch; Gerd Lange, Hünnefeldstrasse 10, 4950 Minden, both of Fed. Rep. of Germany

[21] Appl. No.: 964,122

[22] Filed: Nov. 28, 1978

[30] Foreign Application Priority Data

Nov. 29, 1977 [DE] Fed. Rep. of Germany ....... 2753105

[51] Int. Cl.² .............................................. A01K 97/10
[52] U.S. Cl. .................................. 248/550; 248/563; 248/631
[58] Field of Search ............... 248/550, 564, 563, 562, 248/588, 631, 188.3, 188.2; 267/DIG. 1, DIG. 2; 297/345

[56] References Cited

U.S. PATENT DOCUMENTS

| 3,150,855 | 9/1964 | Carter et al. | 248/550 |
| 3,218,020 | 11/1965 | Rhodes | 248/550 |
| 3,335,996 | 8/1967 | Hall et al. | 248/563 |
| 3,430,444 | 3/1969 | Kamp | 248/631 X |
| 3,879,007 | 4/1975 | Barton et al. | 248/631 X |
| 3,938,770 | 2/1976 | Turner et al. | 248/631 X |
| 3,951,373 | 4/1976 | Swenson | 248/631 X |
| 3,954,245 | 5/1976 | Costin | 248/631 |

Primary Examiner—James T. McCall
Attorney, Agent, or Firm—Salter & Michaelson

[57] ABSTRACT

A spring loaded vehicle seat is of the kind having a seat frame and an underframe supports this seat frame by levers and a pneumatic spring so that the seat is maintained at a constant height. Valves control the flow of air to and from the spring to counteract the effect of vibrations. A switch mechanism controls the operation of the valves and a coupling device transmits vibrations of the seat to the mechanism. The coupling device is arranged so that movement of the mechanism after opening a valve lags behind the vibration of the seat.

10 Claims, 11 Drawing Figures

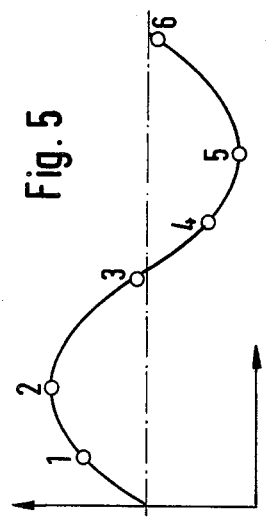
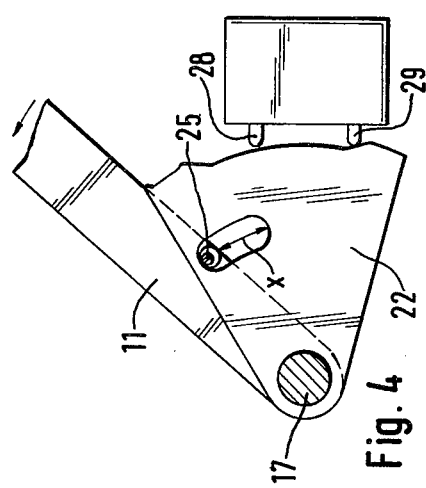
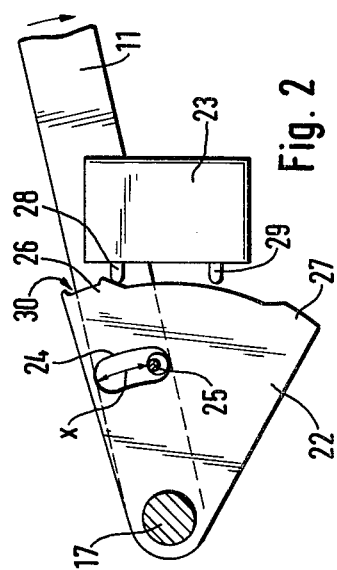
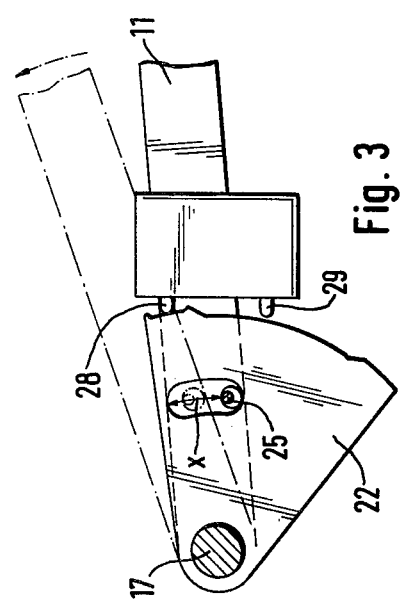

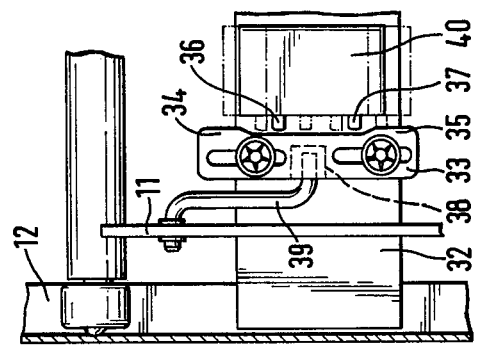
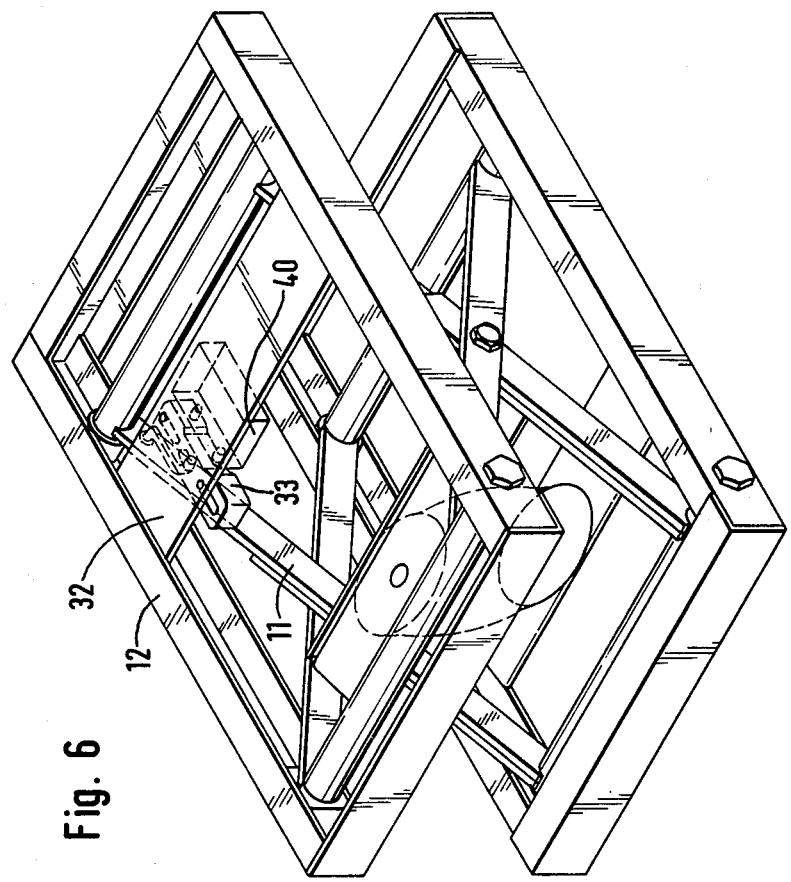

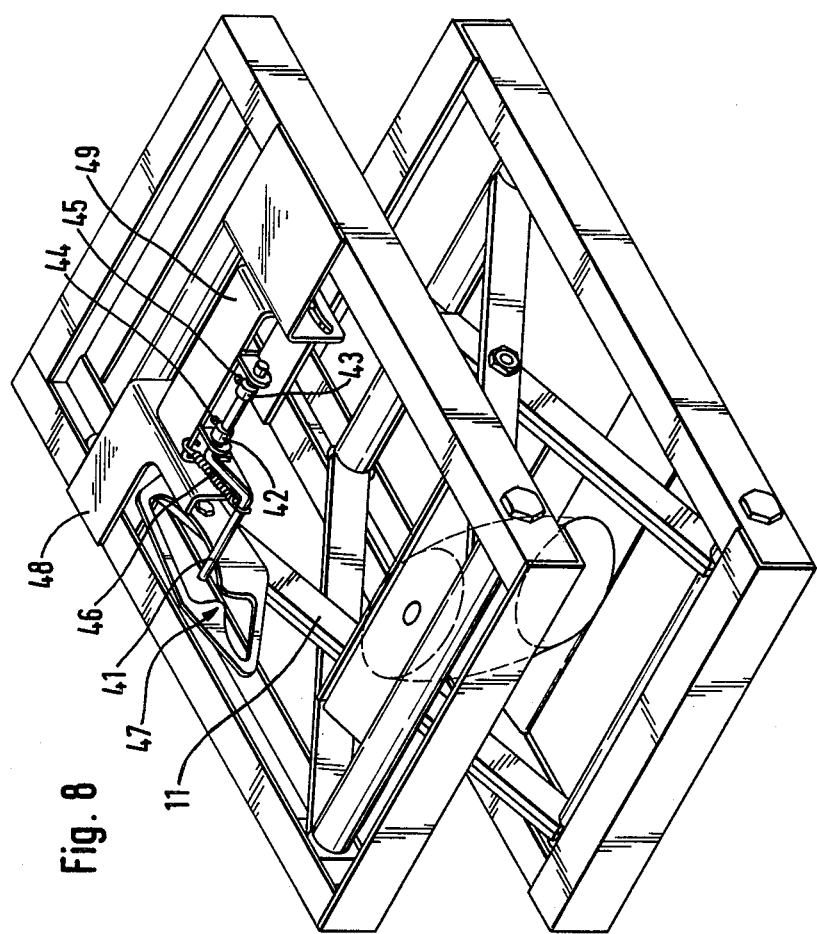

VEHICLE SEAT

This invention concerns a spring-loaded vehicle seat in which a seat frame, which carries the seat cushion, is supported on an underframe by means of levers attached to it with the interposition of a pneumatic spring and in which the selected static height of the seat is automatically kept constant independent of the weight of the occupant at any time in that in vibrational positions above the static height the working internal pressure of the pneumatic spring is reduced by means of a compressed air blow-off valve and in vibrational positions below the static height said pressure is increased by means of a compressed air supply valve, where the opening and closing of the valves takes place by means of a switching mechanism, the movement of which is coupled to the vibrational movement of the seat.

In known seats of this type the vibrational movements of the seat are transmitted continuously to the valve plunger by means of a switch rod. At the same time the switch points of the valves are situated relatively closely above and below the selected static height of the seat in order to maintain this height as exactly as possible in spite of the differing weights of the occupants. By the static height there shoud be understood the height which the seat should assume at stationary (static) loading with the weight of the occupant of the seat at the time. Automatic weight adjustments of this type have the disadvantage that during vibration of the seat about the static height compressed air must be let out of the pneumatic spring or supplied to it continuously. This creates a high level of noise for the occupant of the seat as well as high usage of air. In addition pulses arising at regular intervals from the compressed air operation of the pneumatic spring-mass system may excite critical vibrations. It has therefore been proposed to install valves with time-delays which delay the opening or closing of the valves by about 0.5 seconds after activation of the valve plunger. Such valves are, however, are expensive and are subject to considerable wear since they are activated continually. In addition, they react too slowly to the sudden appearance of large shocks during travel so that the seat is then often thrown against the base before an effective rise in pressure has had a noticeable effect on the pneumatic spring.

It is the object of the invention to design an automatic weight adjustment for vehicle seats of the above-mentioned type which will react immediately but which operates quietly without high levels of noise.

According to the invention a spring loaded vehicle seat includes a seat frame for supporting a seat cushion, an underframe, levers arranged on the seat frame, a pneumatic spring, the seat frame being supported on the underframe by the levers and the pneumatic spring, a selected static height of the seat being automatically maintained constant independent of the weight of the occupant of the seat at any one time, a compressed air blow off valve for decreasing the internal working pressure of the pneumatic spring in positions of the seat above the static height during vibrations, a compressed air supply valve for increasing the internal working pressure of the spring in positions of the seat below the static height, a switch mechanism for opening and closing the valves, and a coupling device coupled to transmit vibrational movement of the seat to the switch mechanism, wherein the switch mechanism is fixed in its respective end position after the opening of a valve and the coupling device includes a lagging segment x so that movement of the switch mechanism after the opening of a valve lags behind the vibrational movement by the extent of the lagging segment x.

The switch mechanism remains coupled to the vibrational movement of the seat and is activated directly and without delay at the switch point for opening the valve. After opening of the valve the vibrational movement of the seat must, however, first pass through the lagging segment x before the valve in question is again closed. In this way the total duration of the processes of air supply and outflow in any vibrational stroke is increased and it is possible without risk to arrange the opening switch point of the valve at a greater distance from the selected static height since the period of air supply or outflow which still remains guarantees a marked increase or decrease of the pressure in the pneumatic spring on each occasion.

Because the opening switch point of the valve is situated at a greater distance above or below the static height it is also brought about that the valves no longer operate continuously but they are activated only when the vibrations of the seat exceed the permissible normal magnitude. Any particular valve is opened only in this event (but then immediately and without delay) and it remains open in total over a relatively long period, so that the working internal pressure of the pneumatic spring is corrected to a noticeable degree and vibrations of the seat which are too pronounced are effectively levelled off during the following vibration. Thus the seat operates more quickly and with only a small production of noise. Since the valves are opened only on real need, and unnecessary switch processes do not occur, the wear is low and the valves have a long life.

Automatic adjustment to weight is guaranteed with a valve according to the invention, in particular when, as in one embodiment of the invention, the lagging segment x of the coupling device substantially corresponds to the distance between the switch position for opening of a valve and the static height of the seat. In this case the closure points of the valves lie immediately at the static height or at a small distance before it, so that the static height is exactly and automatically maintained by means of the closure points of the valves and, in fact, independent of the weight of the occupant of the seat at the time.

For example, if the driver leaves the seat of his vehicle then on account of the working internal pressure of the spring the seat will be forced upwards until the air outflow valve opens. The latter closes again only when the seat has returned to its static height. The greatly reduced working internal pressure then supports the empty seat only. As soon as the same occupant or another has sat down, the seat is first pressed far down below the static height for a short period, the air supply valve opens and shuts again only when the static height has been reached.

Various embodiments of the invention are now described by way of example with reference to the drawings in which:

FIGS. 2, 3 and 4 show parts of the embodiment of FIG. 1 in different positions,

FIG. 5 is a graph illustrating vibration of the seat of FIG. 1,

FIG. 6 is a perspective view of a second embodiment of the invention,

FIG. 7 is a view of part of the embodiment of FIG. 6,

FIG. 8 is a perspective view of a third embodiment of the invention,

Figure 1:
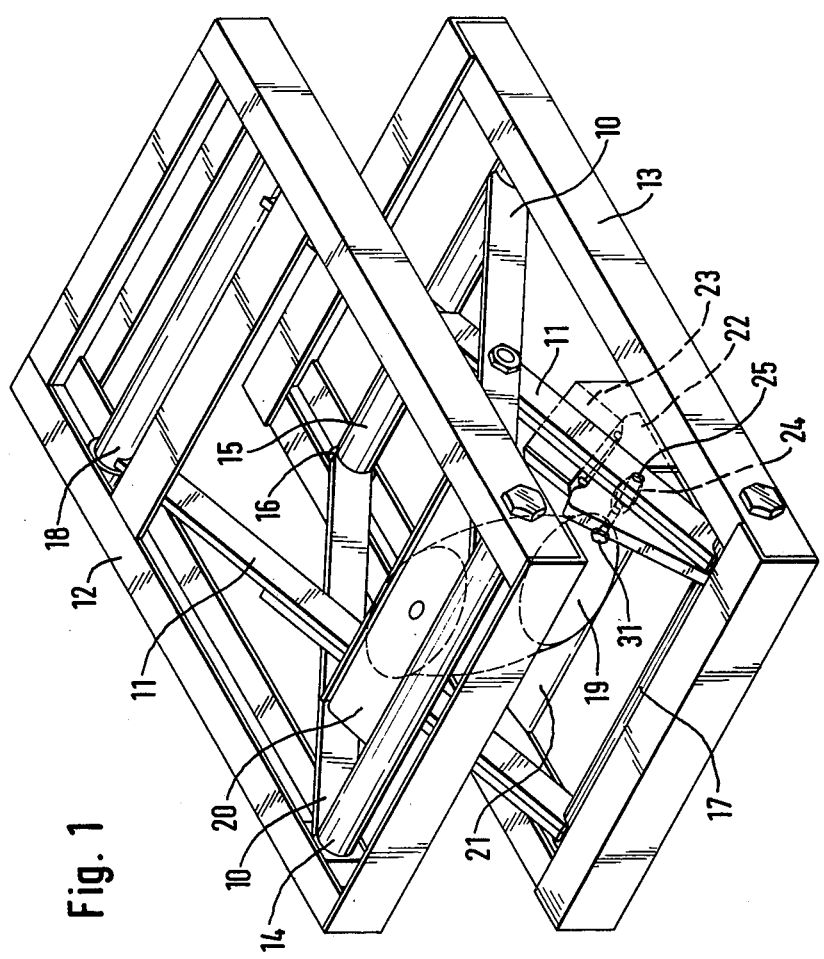
FIG. 1 is a perspective view of one embodiment of the invention.

FIG. 1 shows a vibration system consisting of lateral scissors levers 10 and 11, an upper seat frame 12 which carries the seat cushion and a lower underframe 13 which is attached to the body of the vehicle. The scissors levers 10 are mounted on the seat frame 12 on a fixed shaft 14 and on the underframe on a shaft 15 which can be moved in the underframe by means of rollers 16. The scissors levers 11 are similarly mounted on the underframe on a fixed shaft 17 and on the seat frame on a movable shaft 18. A pneumatic spring 19 is tensioned between the scissors levers by means of cross plates 20 and 21 welded on the levers. The pneumatic spring 19 includes a compressed air supply conduit and a compressed air outflow conduit (not illustrated) which are connected to compressed air valves.

The vibration system with scissors levers described above is only an example by means of which the various examples of embodiment of the invention will be demonstrated in the following. A vibration system with parallelogram levers or another known vibration system might equally well have been used for this purpose. The invention can be implemented for any vibration system. The vibration system illustrated in FIG. 1 is identical with the vibration systems illustrated in FIGS. 6 and 8 so a description of the vibration systems illustrated in FIG. 6 and FIG. 8 can be omitted.

It can be seen from FIG. 1 that a switching plate 22 is mounted to swivel on the fixed shaft 17 in the underframe 13 which said plate is provided with trip cams to activate a valve 23 mounted on the underframe 13 and which is coupled with the vibrational movement of the seat by means of an elongated hole 24 in which there engages a coupling rod 25. FIG. 1 makes the arrangement of these components clear. These components are more accurately shown in FIGS. 2–4.

FIG. 2 shows in cross section the fixed shaft 17 with the switching plate 22 mounted to swivel on it and including the elongate hole 24 in which there engages the coupling rod 25 which is attached to the scissors lever 11. The switching plate includes two trip cams 26 and 27 to actuate valve plungers 28 and 29. The compressed air supply valve is opened by pressing the plunger 28 inwards. When the valve plunger 28 is moved completely out of the valve housing 23 the compressed air supply valve is closed. The valve plunger 29 of the compressed air blow-off valve operates in a similar manner.

Normally, the retaining force of the valve plungers 28 and 29 is sufficient to fix the lagging plate 22 in its end position at any time. If the lagging plate has a large weight and there is a danger that it may fall away from its end position unintentionally it is advisable to provide a stop notch 30 as is shown for the trip cam 26.

Since FIGS. 3 and 4 illustrate the same components as FIG. 2 a special description of FIGS. 3 and 4 is unnecessay. The course of operation of the switch mechanism will now be described with reference to FIGS. 2–4 and in connection with FIG. 5.

FIG. 5 illustrates, in an ideal form, a vibration of the seat. According to FIG. 5 the vibration begins at the static height of the seat. The vibration is assumed to be of high amplitude so that it reaches the switch point 1 at which the valve plunger 29 opens the compressed air blow-off valve as is shown in FIG. 4. The valve plunger 29 is moved along the trip cam 27 and reaches position 2 in FIG. 5. At this position the switch plate becomes fixed and the scissors lever 11 vibrates backwards. During this process the coupling rod 25 at first runs over the lagging segment x. When this segment has been covered the switch plate is forced downwards and the valve plunger 29 slips away from the trip cam 27 so that the switch point 3 of FIG. 5 is reached and the compressed air blow-off valve closes. Since the closure process is always subject to a certain inertia the switch point 3 is situated close in front of the point of attainment of the static height.

FIG. 2 shows the switch point 4 at which the valve plunger 28 of the compressed air supply valve is moved along the trip cam 26 until it reaches its end position at point 5. This end position is illustrated in FIG. 3. The coupling rod 25 then once again passes through the lagging segment x until the switch point 6 is reached, shortly before the static height (FIG. 5) when the compressed air supply valve closes again.

It can be seen from FIG. 5 that, in this example of embodiment, the lagging segment x corresponds substantially to the distance between the switch positions 1 and 4, that is the point at which one of the valves is opened and the static height of the seat.

In order to alter the static height of the seat, the valves 28, 29 can be displaced relative to the movement of the trip cams 26,27 as will be described in more detail with reference to FIG. 7. The static height of the seat in the example of embodiment according to FIGS. 2–4 can, however, also be changed in that that part of the coupling rod 25 which engages in the longitudinal hole 24 is designed, as illustrated, to be eccentric and that the coupling rod is mounted to rotate on the scissors lever 11. In this case rotation of the coupling rod is sufficient to change the switch points in FIG. 5 and thus the static height of the seat. The lagging segment x remains constant in this process.

If it is required to adjust the lagging segment x, for example in order to bring about an earlier opening of the compressed air blow-off valve at switch point 1 in FIG. 5, it may be provided, according to a convenient form of embodiment of the invention, that a screw 31 is inserted into the head section of the elongated hole 25, as is shown in FIG. 1, for example.

FIGS. 6 and 7 show an example of embodiment of the invention in which the switch mechanism consists of a sliding carriage switch 33 mounted to slide on a cross plate 32 in the upper seat frame 12, said sliding carriage including trip cams 34 and 35 to actuate valve plungers 36 and 37. The sliding carriage switch is coupled with the vibrational movement of the seat by means of an elongated hole 38 in which there engages a coupling rod 39. In this case the vibrational movement is picked up from the vibration system in the neighbourhood of the upper roller bearing of the scissors lever 11 by means of a bent coupling rod 29.

FIG. 7 shows the two valve plungers 36 and 37 in a common housing 40. This valve housing can be moved on the cross plate 32 in order to adjust the static height of the seat, as is shown in broken lines in FIG. 7.

FIGS. 8–11 show a third example of embodiment of the invention in which the switch mechanism consists of a switch lever 41 mounted to pivot on the frame, said lever being provided with trip cams 42 and 43 to actuate valve plungers 44 and 45. The switch lever is designed to be bent over at right angles and is loaded by a tension spring 46 which can switch the lever out of the neutral positon illustrated in FIG. 9 towards opposite sides. The bent over end of the switch lever 41 operates in conjunction with a cam 47 which is fixed to the scissors lever 11, as is shown more clearly in FIG. 9.

FIG. 9 again illustrates the two scissors levers 10 and 11 and it can be seen that the cam 47 is fixed rigidly to the scissors lever 11. Behind the cam 47 there can be seen a holding angle piece 48 which carries a valve mounting plate 49. The valve mounting plate 49 is mounted to pivot within a curved guide 51 of the holding angle piece by means of lateral rollers 50.

Figure 10:
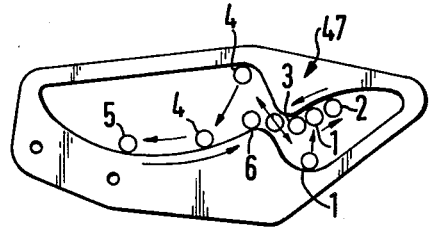
FIG. 10 is a diagrammatic view showing the relative positions of parts seen in FIG. 9.
Figure 11:
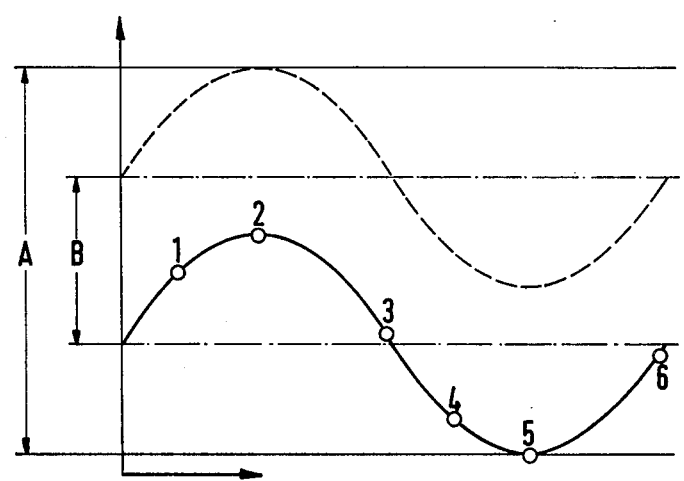
FIG. 11 is a graph illustrating vibration of the seat of FIGS. 9 and 10.

FIGS. 10 and 11 show the sequence of the switching positions of the right-angled switch lever 41 relative to the cam 47. For correct understanding it must, however, be emphasised that in FIG. 10 only the relative positions of the switch lever 41 with respect to the cam 47 are illustrated, since during the operation of the vibration system the cam 47 essentially is in motion while the switch lever 41 only carries out a pivoting movement about the axis 51.

FIG. 11 shows in full lines a vibration of the system in an idealised form. The vibration again begins at the static height and reaches the switching position 1 at which the compressed air blow-off valve opens. It can be seen from FIG. 10 that, by means of the tension spring 46 and with the support of the cam, the switch lever springs over from 1 to 1 immediately after the opening of the compressed air blow-off valve and is held in this end position in which it acts in conjunction with the partial section of the cam 47, made up of two sections, which is shown on the right in FIG. 10. The springing of the switch lever 41 across a relatively large interval produces an unambiguously defined opening of the compressed air blow-off valve which is free from delay. During the remainder of the stroke of the vibration the switch lever is guided over the right-hand section of the cam 47 through the position 2 into the position 3, during which time it passes through the lagging segment according to FIG. 11. The compressed air blow-off valve is closed at the switch position 3.

Figure 9:
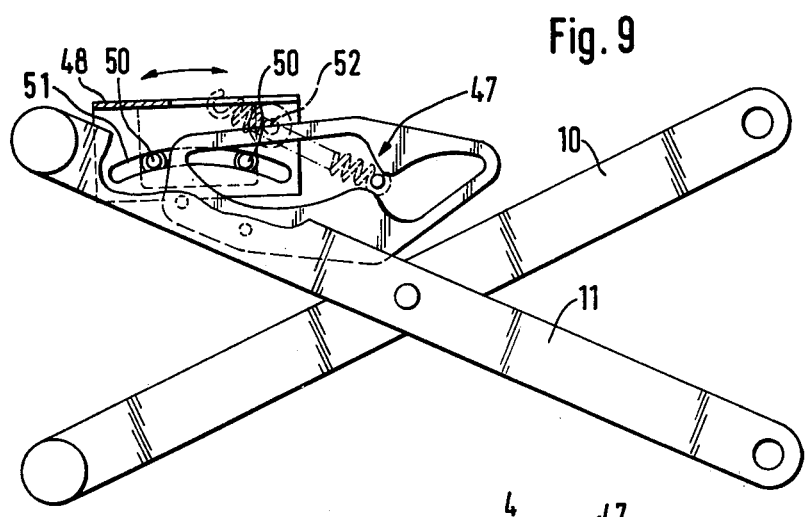
FIG. 9 is a view of part of the embodiment of FIG. 8.

The switch lever then again takes up its neutral position as illustrated in FIG. 9. In this neutral position the switch lever remains substantially unactivated until it is forced by the left-hand section of the cam illustrated in FIG. 10 to spring over from 4 to 4 and to open the compressed air supply valve as in switch position 4 of FIG. 11. After the compressed air supply valve has been opened the switch lever is held by means of the tension spring 46 in fixed application against the section of the cam 47 which is shown on the left in FIG. 10 and is guided through position 5 into the switch position 6 in which the compressed air supply valve closes. The switch lever then again resumes its neutral position as illustrated in FIG. 9.

In the vehicle seat according to the invention, when vibrations occur who do not reach the switch points 1 and 4 at their maximum amplitudes the switch lever remains in its neutral position in the absence of further activation. There is thus produced a relatively low loading of the switch mechanism since it is activated only by vibrations of larger amplitude, as is shown in FIG. 11.

FIG. 11 shows that in the seat according to the invention an adjustment in height can be produced in the simplest possible manner by changing the static height of the seat. If the static height corresponding to the lower curve of FIG. 11 is to be changed to that of the upper curve in FIG. 11, which is shown in broken lines, it is necessary only for the valve mounting plate 49 to be displaced in the curved guide 51. This may take place, for example, by means of a cable line or a simple sweep rod. In FIG. 11, the maximum vibrational stroke A of the vibration system allowable on constructional grounds is shown and extends from the upper end stop to the lower end stop. Taking as a basis the normal vibration with the order of magnitude illustrated, there is available a height adjustment of the seat over the range denoted by B.

What we claim as our invention and desire to secure by Letters Patent of the United States is:

1. A spring loaded vehicle seat including a seat frame for supporting a seat cushion, an underframe, levers arranged on the seat frame, a pneumatic spring, the seat frame being supported on the underframe by the levers and the pneumatic spring, a selected static height of the seat being automatically maintained constant independent of the weight of the occupant of the seat at any one time, a compressed air blow-off valve for decreasing the internal working pressure of the pneumatic spring in positions of the seat above the static height during vibrations, a compressed air supply valve for increasing the internal working pressure of the springs in positions of the seat below the static height, a switch mechanism for opening and closing the valves, and a coupling device coupled to transmit vibrational movement of the seat to the switch mechanism, wherein the switch mechanism is fixed in its respective end position after the opening of a valve and the coupling device includes a lagging segment x so that movement of the switch mechanism after the opening of a valve lags behind the vibrational movement by the extent of the lagging segment x.

2. A vehicle seat according to claim 1 wherein the lagging segment x corresponds substantially to the distance between the switching positions at the opening of a valve and the static height of the seat.

3. A vehicle seat according to claim 1 wherein the switch mechanism includes a switching plate pivotally mounted on the frame or on one of the levers, trip cams being provided on said plate for actuating the valves, and the plate transmits vibrations of the seat through an elongate hole within which is engaged a coupling rod.

4. A vehicle seat according to claim 1 wherein switch mechanism includes a sliding carriage switch movably mounted on the seat frame, the carriage being provided with trip cams for actuating the valves, and the carriage transmits vibrations of the seat through an elongate hole within which is engaged a coupling rod.

5. A vehicle seat according to claim 3 or 4 wherein the part of the coupling rod which engages in the elongate hole is eccentric and the coupling rod is rotatably mounted.

6. A vehicle seat according to claim 3 or 4 wherein the lagging segment x of the elongated hole is adjustable by a screw which is screw engaged in the head section of the elongate hole.

7. A vehicle seat according to claim 1 wherein the switch mechanism comprises a switch lever pivotable on the frame and the switch lever is provided with trip cams for actuating the valves, the lever being coupled to transmit vibrations of the seat by a cam fixed to one of said supporting levers and against the cam is applied the end of the switch lever, said end being bent over at 90°.

8. A vehicle seat according to claim 7 wherein the bent over end of the switch lever is spring loaded by a tension spring which causes the switch lever to spring over in the opposite direction when one of the valves is opened, said bent over end of the lever being applied against one of two sections of the cam.

9. A vehicle seat according to claim 3 or 4 wherein the valves are movably or pivotally mounted, either individually or together, relative to the movement of the trip cams.

10. A vehicle seat according to claim 5, wherein the lagging segment x of the elongated hole is adjustable by a screw which is screw engaged in the head section of the elongate hole.

* * * * *